United States Patent
Kim et al.

(10) Patent No.: US 9,324,134 B2
(45) Date of Patent: Apr. 26, 2016

(54) DISPLAY APPARATUS AND CONTROL METHOD THEREOF

(71) Applicant: LG ELECTRONICS INC., Seoul (KR)

(72) Inventors: Jihwan Kim, Seoul (KR); Jongho Kim, Seoul (KR); Doyoung Lee, Seoul (KR); Eunhyung Cho, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 14/223,489

(22) Filed: Mar. 24, 2014

(65) Prior Publication Data

US 2015/0235346 A1    Aug. 20, 2015

(30) Foreign Application Priority Data

Feb. 17, 2014    (KR) ........................ 10-2014-0017603

(51) Int. Cl.
  *G06T 3/60* (2006.01)
  *G09G 5/14* (2006.01)
  *G09G 5/16* (2006.01)
  *G09G 5/36* (2006.01)

(52) U.S. Cl.
  CPC *G06T 3/60* (2013.01); *G09G 5/363* (2013.01); *G09G 5/14* (2013.01); *G09G 5/16* (2013.01); *G09G 2340/0492* (2013.01); *G09G 2354/00* (2013.01)

(58) Field of Classification Search
  None
  See application file for complete search history.

(56) References Cited

U.S. PATENT DOCUMENTS

| | | | |
|---|---|---|---|
| 8,362,992 B2 | 1/2013 | Kuhlman et al. | |
| 2011/0267530 A1* | 11/2011 | Chun | 348/333.11 |
| 2012/0019434 A1 | 1/2012 | Kuhlman et al. | |
| 2012/0060089 A1 | 3/2012 | Heo et al. | |
| 2012/0105428 A1 | 5/2012 | Fleck et al. | |
| 2012/0256854 A1* | 10/2012 | Lee et al. | 345/173 |
| 2012/0256886 A1 | 10/2012 | Ryu et al. | |
| 2014/0232704 A1* | 8/2014 | Kim et al. | 345/204 |
| 2015/0024728 A1* | 1/2015 | Jang | 455/418 |
| 2015/0035770 A1* | 2/2015 | Lee | G06F 3/041 345/173 |
| 2015/0145767 A1* | 5/2015 | Takayama | 345/156 |

FOREIGN PATENT DOCUMENTS

WO    WO 2014/010931 A1    1/2014

* cited by examiner

*Primary Examiner* — Chante Harrison
(74) *Attorney, Agent, or Firm* — Birch, Stewart, Kolasch & Birch, LLP

(57) ABSTRACT

Disclosed are a display apparatus and a control method thereof. The display apparatus includes a transparent display unit to display content including a first part and a second part based on a first direction in which a first user is located, a sensor unit to receive information sensed in a second direction opposite to the first direction, and a controller to implement mirror flipping the second part to be displayed in the second direction according to the received sensed information. The transparent display unit displays the first part in the first direction and the mirror flipped second part. The first part and the second part are included in the same content, the first part is set to maintain the first direction, and the second part is set to be mirror flipped based on the second direction.

18 Claims, 9 Drawing Sheets

FIG. 4
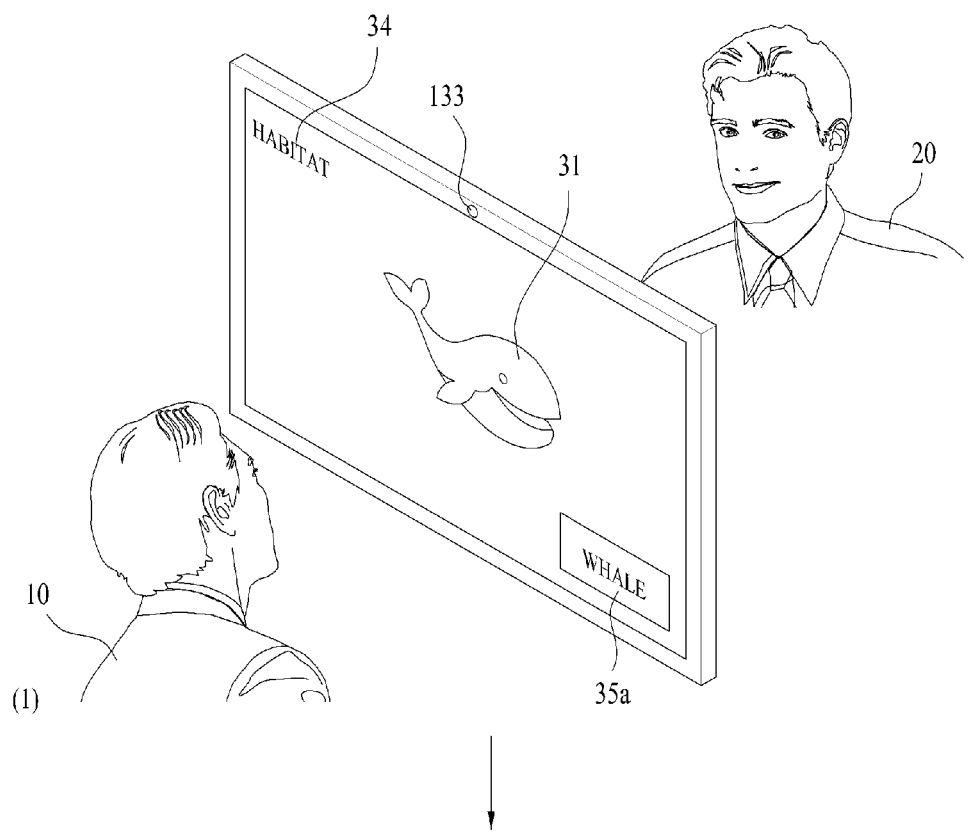
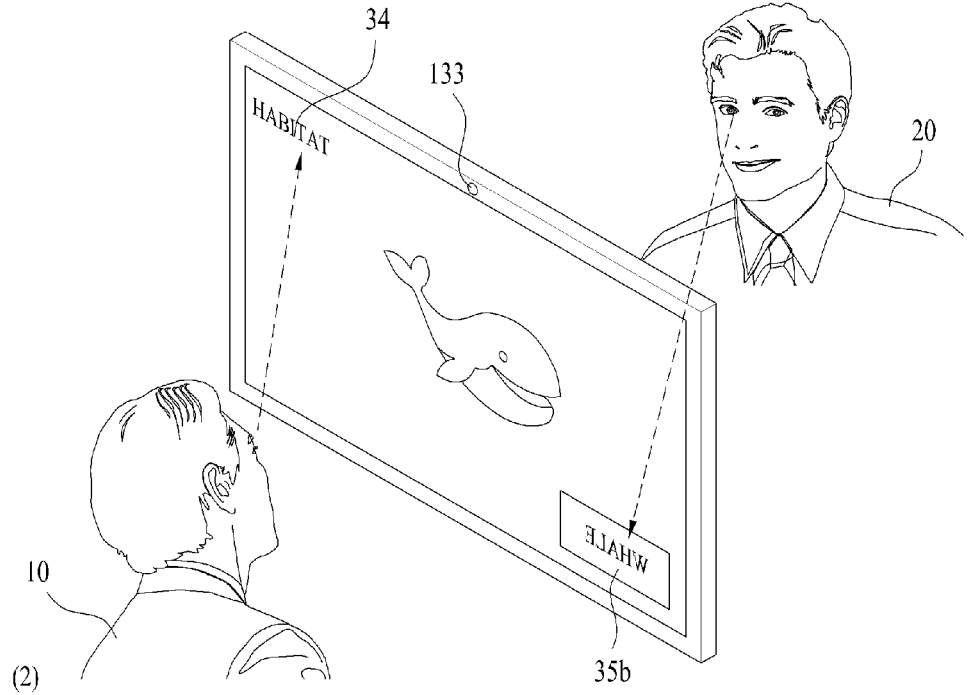

FIG. 5
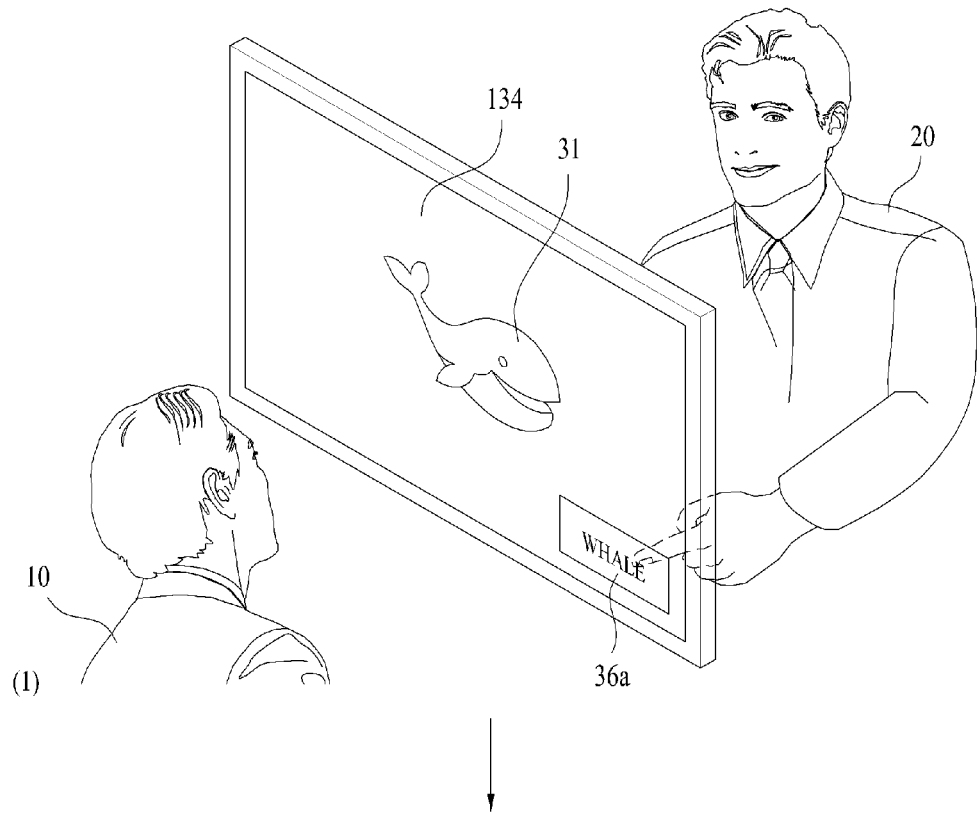
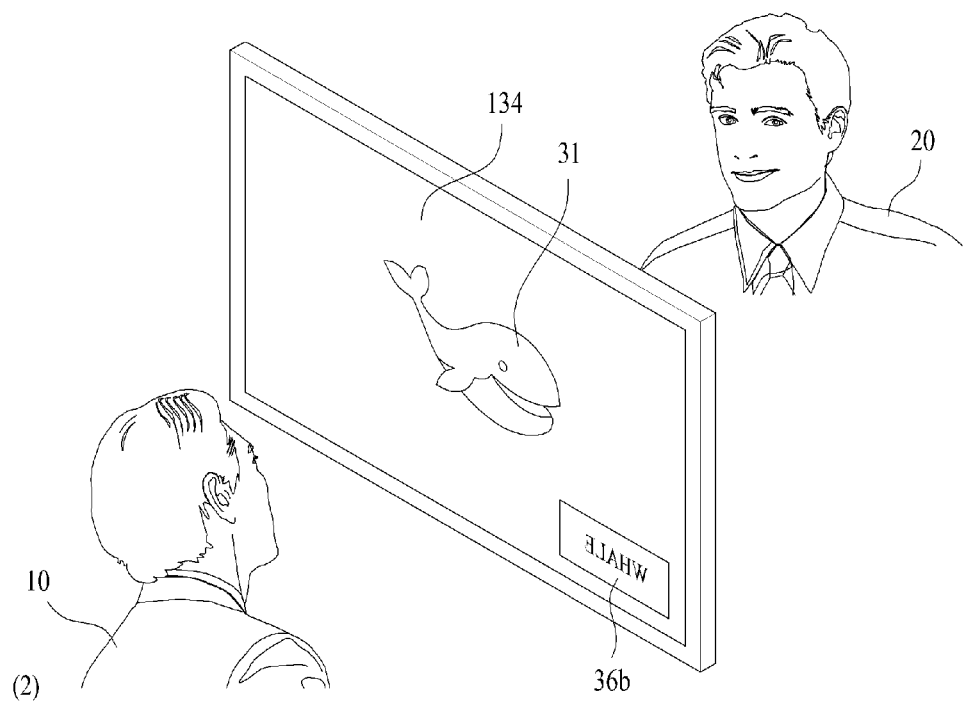

FIG. 8
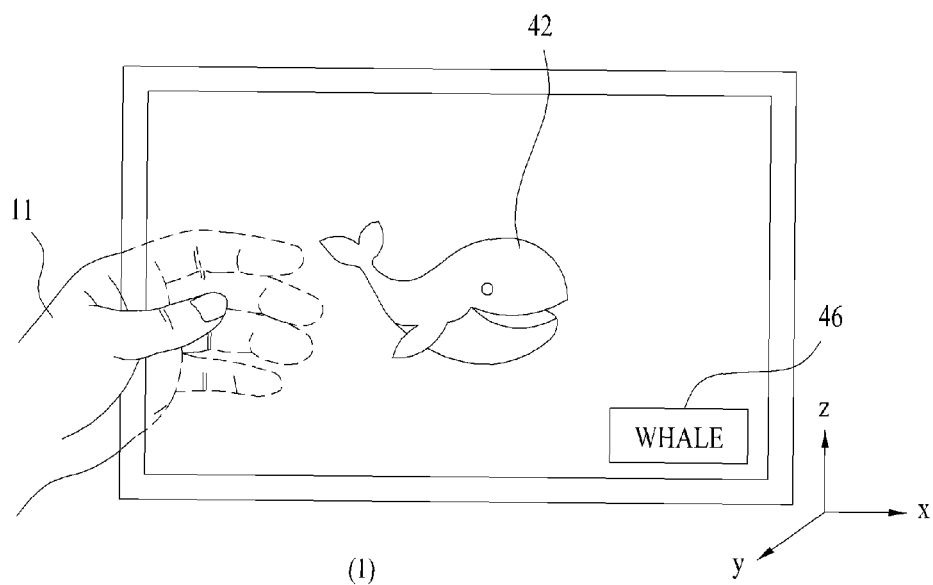
(1)
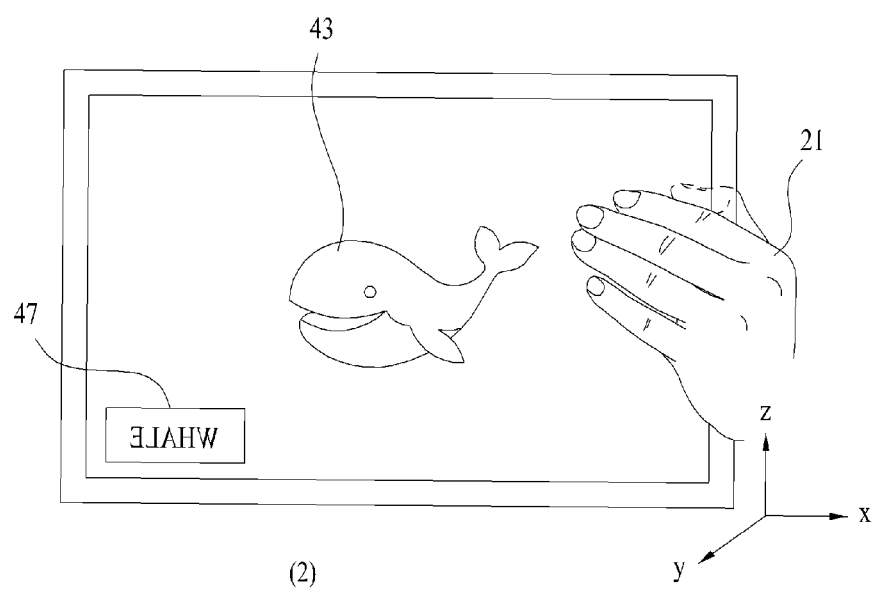
(2)

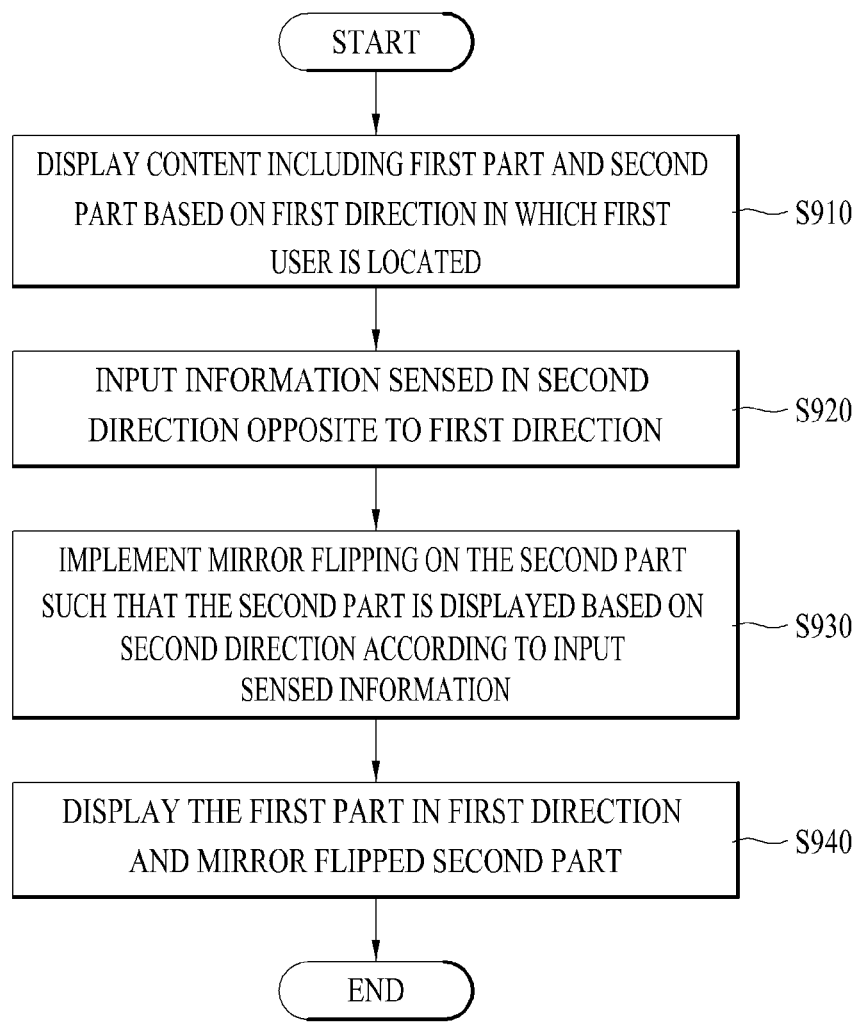

DISPLAY APPARATUS AND CONTROL METHOD THEREOF

The present invention claims priority of Korean Patent Application No. 10-2014-0017603, filed on Feb. 17, 2014, which is incorporated herein by reference in its entirety.

BACKGROUND OF THE INVENTION

1. Field of the Invention

The present disclosure relates to a display apparatus and a control method thereof, and more particularly to a display apparatus configured to display content on a transparent display unit and a control method thereof.

2. Discussion of the Related Art

Through development of electronics, various display apparatuses have been developed. Display apparatuses including various display elements, such as Cathode Ray Tubes (CRTs), Liquid Crystal Displays (LCDs), Plasma Display Panels (PDPs), Organic Light Emitting Diodes (OLEDs), etc., are known. However, conventional display apparatuses are limited in that viewing is only possible in a given direction in which a display unit is arranged.

To overcome the above described limit, research into transparent display apparatuses is being conducted. Transparent display apparatuses include a transparent display unit, and therefore have an advantage of allowing a user to view a subject at the rear of the display unit as well as content displayed on the display unit. Another advantage is that a user and a person who is opposite the user may view content displayed on the display unit together.

However, research into transparent display apparatuses has focused on hardware development and utilization. Accordingly, research into display of content on a display unit and control thereof are insufficient.

SUMMARY OF THE INVENTION

Accordingly, the present disclosure is directed to a display apparatus and a control method thereof that substantially obviate one or more problems due to limitations and disadvantages of the related art.

An object of the present disclosure is to provide a display apparatus to allow users who are located in opposite directions of the display apparatus to effectively enjoy the same content and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display apparatus includes a transparent display unit configured to display content including a first part and a second part on the basis of a first direction in which a first user is located, a sensor unit configured to receive information sensed in a second direction opposite to the first direction, and a controller configured to implement mirror flipping the second part to be displayed in the second direction according to the received sensed information, wherein the transparent display unit displays the first part in the first direction and the mirror flipped second part, and wherein the first part and the second part are included in same content, the first part is set to maintain the first direction in which the first user is located, and the second part is set to be mirror flipped based on the second direction.

The mirror flipped second part may be displayed as being switched from left to right while maintaining a displayed position thereof.

The sensor unit may include a camera oriented to capture an image of a subject in the second direction, the camera may capture an image of a second user located in the second direction, and the controller may implement mirror flipping the second part upon recognizing the second user based on information related to the captured image.

The sensor unit may include a proximity sensor configured to sense a subject in the second direction, the proximity sensor may sense information related to the second user located in the second direction, and the controller may implement mirror flipping the second part upon recognizing the second user based on the sensed information.

The sensor unit may include a gaze sensor configured to sense gaze of the first user and second user, the gaze sensor may receive information related to the gaze of the second user located in the second direction, and the controller may implement mirror flipping the second part, to which the gaze of the second user is directed, based on the gaze information.

The controller may implement mirror flipping the second part to be alternately displayed in the first direction and the second direction for a predetermined period when the gaze sensor simultaneously senses the gaze of the first user and the gaze of the second user with respect to the second part.

The sensor unit may include a touch sensor configured to enable a touch input from the second direction, the touch sensor may receive a touch instruction of the second user, and the controller may implement mirror flipping the touched second part based on the touch instruction.

The controller may implement mirror flipping the second part to be alternately displayed in the first direction and the second direction for a predetermined period.

The predetermined period may be set based on at least one of the length of text and the number of words included in text when the second part includes text.

The predetermined period may be set to at least one of a time interval until a predetermined time ends or a time interval until a user instruction is input, wherein the predetermined period is one turn.

The text may be displayed in a first language when displayed in the first direction, and may be displayed in a second language when displayed in the second direction.

The controller may stop mirror flipping of the second part when no information is sensed in the second direction.

Upon receiving a touch instruction with respect to the second part to be mirror flipped, the controller may hold mirror flipping of the second part to be displayed in a direction in which the touch instruction is input.

The second part may include at least one of text, video, and a map.

The sensor unit may further receive information sensed in the first direction, and may sense information related to at least one of a touch area and a touch shape of the user hand that grips the display apparatus, and the controller may determine a direction in which the user is located based on the sensed information, and may display the first part based on the determined direction.

In accordance with another aspect of the present disclosure, a control method of a display apparatus including a transparent display unit, includes displaying content including a first part and a second part based on a first direction in which a first user is located, receiving information sensed in a second direction opposite to the first direction, implementing mirror flipping the second part to be displayed in the second direction according to the received sensed information, and displaying the first part in the first direction and the mirror flipped second part, wherein the first part and the second part are included in same content, the first part is set to maintain the first direction in which the first user is located, and the second part is set to be mirror flipped based on the second direction.

The control method may further include implementing mirror flipping the second part to be alternately displayed in the first direction and the second direction for a predetermined period.

The predetermined period may be set based on at least one of the length of text and the number of words included in text when the second part includes text.

The text may be displayed in a first language when displayed in the first direction, and may be displayed in a second language when displayed in the second direction.

The control method may further include stopping mirror flipping of the second part when no information is sensed in the second direction.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a view explaining a third embodiment of mirror flipping of content;

FIG. 5 is a view explaining a fourth embodiment of mirror flipping of content;

FIG. 8 is a view explaining one embodiment related to switching of the display direction of content; and FIG. 9 is a view explaining a control method of a display apparatus in accordance with one embodiment of the present disclosure.

DETAILED DESCRIPTION OF THE INVENTION

Figure 1:
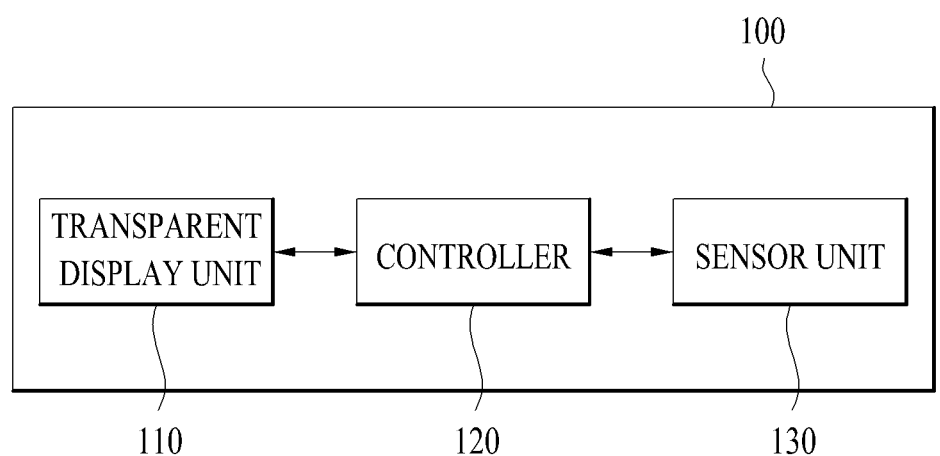
FIG. 1 is a block diagram of a display apparatus in accordance with one embodiment of the present disclosure.

Hereinafter, exemplary embodiments of the present disclosure for concrete realization of the above described object will be described in detail with reference to the accompanying drawings. In this case, configurations and operations of the present disclosure as illustrated in the drawings and explained with reference to the drawings will be described in at least one embodiment, and technical sprit of the present disclosure and core configurations and operations thereof should not be limited by the at least one embodiment.

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

FIG. 1 is a block diagram of a display apparatus in accordance with one embodiment of the present disclosure.

The display apparatus 100 may include a transparent display unit 110, a controller 120, and a sensor unit 130.

The transparent display unit 110 may display content including a first part and a second part on the basis of a first direction in which a first user is located. In a general display apparatus, a first direction may mean a front direction of a display unit that displays content, and a second direction may be a direction opposite to the first direction on the basis of a display face of a display unit.

The first part and the second part may mean components contained in the same content. For example, when the display apparatus 100 displays video, the video may include images, control tools, captions, advertisements, etc. Here, the video is content, and each of the images, control tools, captions, and advertisements is the first part or the second part. The first part may be set to maintain the first direction in which the first user is located, and the second part may be set to be mirror flipped on the basis of the second direction. One or more first parts and second parts may be present in content.

The controller 120 may implement mirror flipping on the second part such that the second part is displayed on the basis of the second direction based on sensed information input by the sensor unit 130. The input sensed information may be a user image, a user sensing signal, user gaze information, a user touch input signal, or the like based on a configuration of the sensor unit 130.

Mirror flipping may mean switching an object from the left side to the right side or vice versa while maintaining a display position and upper and lower sides of the object. More specifically, mirror flipping means effects of rotating an object leftward or rightward on the basis of a center axis thereof. In the present disclosure, the second part may be displayed by being switched from the left to the right or vice versa at a fixed display position thereof.

The sensor unit 130 may receive information sensed in the second direction opposite to the first direction. For example, the sensor unit 130 may be a camera to capture an image of a subject, a proximity sensor to sense a subject within a given distance, a gaze sensor to track the gaze of a user, a touch sensor to receive a user touch instruction, and the like. It will be appreciated that the sensor unit 130 may be configured in one or more manners. That is, the sensor 130 may include at least one of the camera, the proximity sensor, the gaze sensor, and the touch sensor. The sensor unit 130 may be oriented toward the second direction of the display apparatus 100. In addition, the sensor unit 130 may be additionally oriented toward the first direction of the display apparatus 100.

For example, the sensor unit 130 may include a touch sensor oriented toward the first direction of the transparent display unit 110, and a camera oriented toward the second direction of the transparent display unit 110. Alternatively, the sensor unit 130 may include a first gaze sensor oriented toward the first direction of the transparent display unit 110, and a second gaze sensor oriented toward the second direction of the transparent display unit 110. As occasion demands, the sensor unit 130 may include a touch sensor and a gaze sensor oriented toward the first direction of the transparent display unit 110, and a touch sensor and a camera oriented toward the second direction of the transparent display unit 110. The aforementioned configurations are given by way of example, and the sensor unit 130 may be configured in combinations of various numbers of various elements.

The sensor unit 130, oriented toward the first direction, may sense information related to the first user who is located in the first direction. The sensor unit 130, oriented toward the second direction, may sense information related to a second user who is located in the second direction.

The controller 120 may implement mirror flipping on the second part to display the second part on the basis of the second direction based on input sensed information, and the transparent display unit 110 may display the first part displayed on the basis of the first direction and the mirror flipped second part. Hereinafter, various embodiments of mirror flipping will be described.

Figure 2:
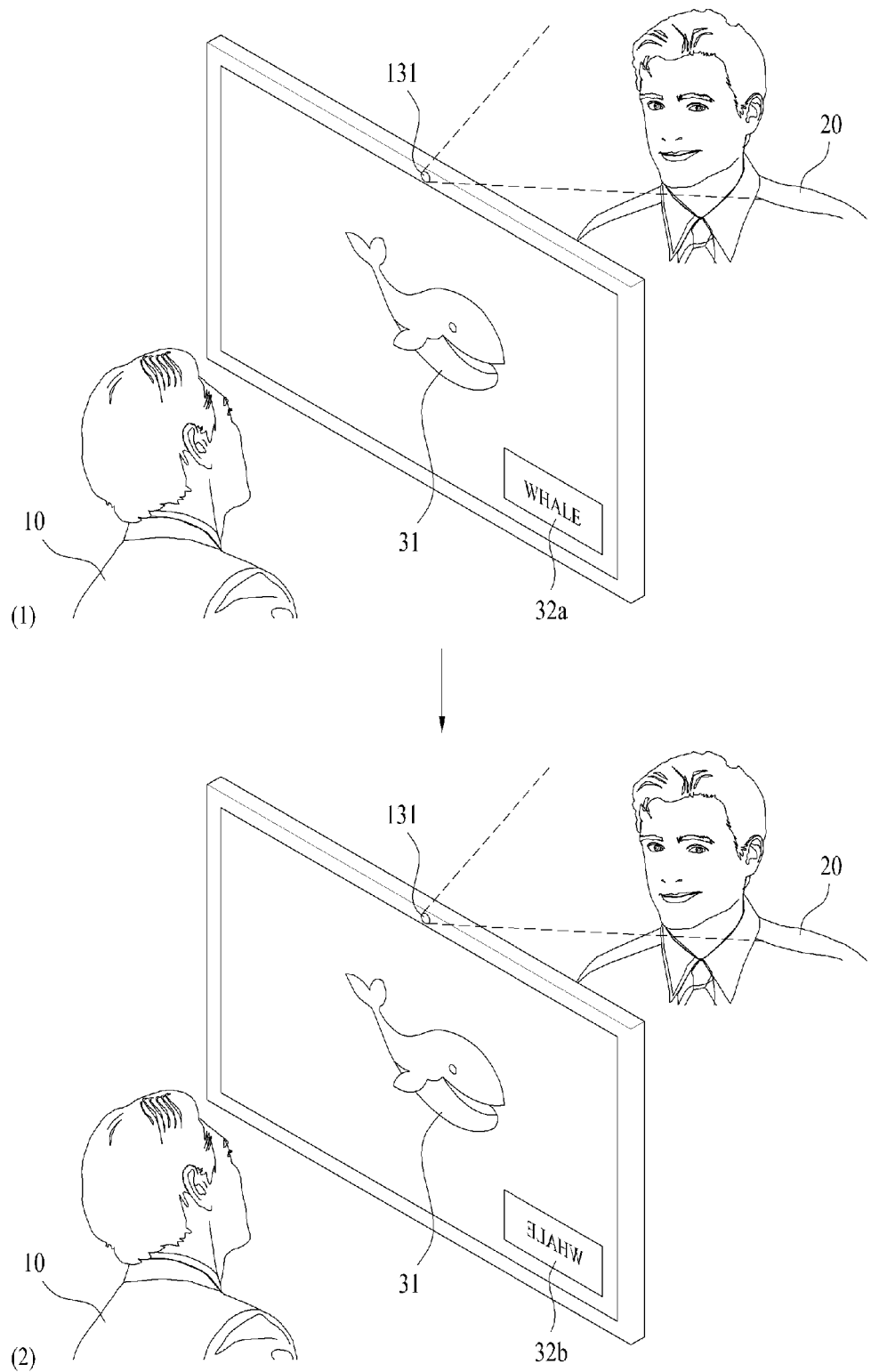
FIG. 2 is a view explaining a first embodiment of mirror flipping of content.

FIG. 2 is a view explaining a first embodiment of mirror flipping of content. Referring to FIG. 2, the embodiment of mirror flipping a second part when the sensor unit includes a camera is shown.

Referring to FIG. 2(1), the sensor unit of the display apparatus may include a camera 131 oriented to capture an image of a subject located in a second direction. The display apparatus displays content. The content includes a first part 31 in the form of an image, and a second part 32a in the form of text. The first part 31 and the second part 32a may be predetermined.

For example, an image may be set to the first part, and text may be set to the second part. Setting of the first part and the second part may be changed by a user. In addition, the same component may be differently set based on content. For example, an image may be set to the first part in the case of first content, and may be set to the second part in the case of second content. In addition, a component set to the first part in the first content may be set to the second part by the user or vice versa.

The display apparatus may display content on the basis of a direction in which a first user 10 is located. The first user 10 and a first direction are equal to a user and a display direction of a conventional display apparatus as described above. When a second user 20 is located in a second direction, the camera 131 captures an image of the second user 20. For example, the camera 131 may be turned on by the first user 10. Alternatively, the display apparatus may further include a sensor (not shown) oriented toward the second direction, and the camera 131 may be turned on when the sensor senses a subject located in the second direction.

The display apparatus may capture an image of the second user 20 and analyze the captured image. The controller of the display apparatus may implement mirror flipping on the second part 32a upon recognizing the second user 20 based on the analyzed image.

Referring to FIG. 2(2), a mirror flipped second part 32b is shown. That is, the display apparatus may display the first part 31 in the form of an image on the basis of the first direction in which the first user 10 is located. Simultaneously, the display apparatus may display the second part 32b in the form of text on the basis of the second direction in which the second user 20 is located.

Through the above described procedure, the display apparatus may display content such that the first part and the second part included in the same content are displayed toward different directions.

Figure 3:
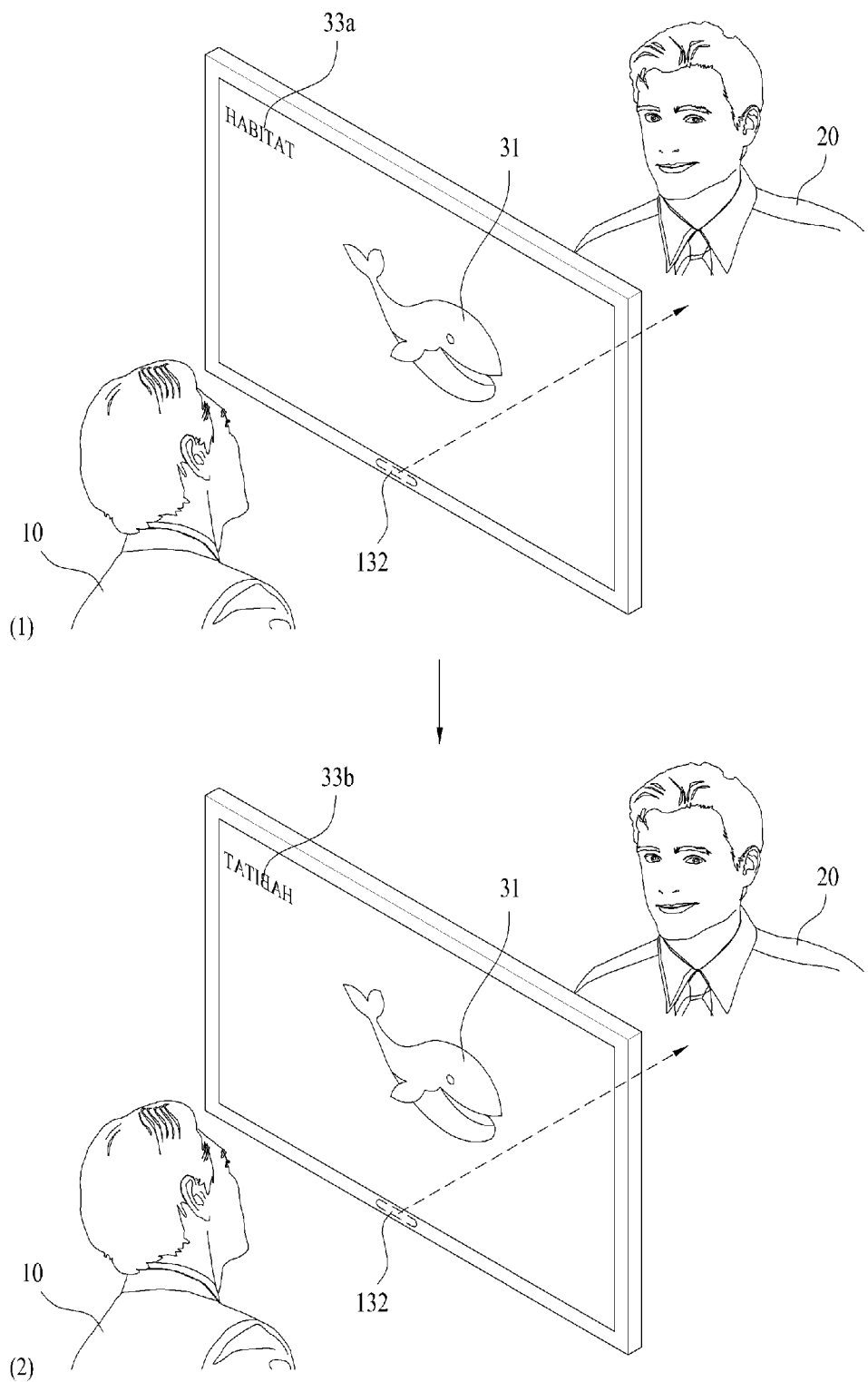
FIG. 3 is a view explaining a second embodiment of mirror flipping of content.

FIG. 3 is a view explaining a second embodiment of mirror flipping of content. Referring to FIG. 3, the embodiment of mirror flipping a second part when the sensor unit includes a proximity sensor is shown.

Referring to FIG. 3(1), the sensor unit of the display apparatus may include a proximity sensor 132 to sense a subject in a second direction. The display apparatus displays content. The content may include the first part 31 in the form of an image and a second part 33a in the form of text. The first part 31 and the second part 33a may be predetermined.

When a user views the second part backwards, the second part may mean a region that the user cannot know what is it or that confuses the user. For example, the second part may include at least one of text, video, and a map. Meanwhile, the first part may mean a region that the user can know what is it or that does not confuse the user even when the user views the first part backwards. As such, the second part may be predetermined in content or predetermined by the display apparatus. However, setting of the first part and the second part may be changed by the user.

The display apparatus may display content on the basis of a direction in which the first user 10 is located. When the second user 20 is located in a second direction, the proximity sensor 132 may sense the second user 20 and receive sensed information. The controller of the display apparatus may implement mirror flipping on the second part 33a upon recognizing the second user 10 based on input sensed information.

Referring to FIG. 3(2), a mirror flipped second part 33b is shown. That is, the display apparatus may display the first part 31 in the form of an image on the basis of a first direction in which the first user 10 is located. Simultaneously, the display apparatus may display the second part 33b in the form of text on the basis of a second direction in which the second user 20 is located. Through the above described procedure, the display apparatus may display content such that the first part and the second part included in the same content are displayed toward different directions.

The first user 10 and the second user 20 are located in opposite directions of the display apparatus. As described above, the second part may mean a region that the user cannot know what is it or that confuses the user when the user views the second part backwards. Thus, while the display apparatus recognizes the first user 10 and the second user 20 located in opposite directions of a display face, the display apparatus may alternately implement mirror flipping on the second part for a predetermined period. That is, the display apparatus may repeatedly implement a procedure of displaying the second part toward the first direction and then displaying the second part toward the second direction. An embodiment of alternately displaying the second part will be described below.

FIG. 4 is a view explaining a third embodiment of mirror flipping of content. Referring to FIG. 4, the embodiment of mirror flipping a second part when the sensor unit includes a gaze sensor is shown.

Referring to FIG. 4(1), the sensor unit of the display apparatus may include a gaze sensor 133 to sense the gaze of the first user 10 and the gaze of the second user 20. In this case, the gaze sensor 133 may include a first sensor to sense the gaze of the first user 10 located in a first direction and a second sensor to sense the gaze of the second user 20 located in a second direction.

The display apparatus displays content. The content may include the first part 31 in the form of an image and second parts 34 and 35a in the form of text. A plurality of second parts may be present in one piece of content. As occasion demands, no second part may be present. Likewise, a plurality of first parts may be present, or no first part may be present. The second part may be predetermined in content or predetermined by the display apparatus, or may be changed by the user.

The first user 10 and the second user 20 view the same content. As exemplarily shown in FIG. 4(1), the gaze of the first user 10 may be directed to the text "habitat" 34 at the upper end of a display face, and the gaze of the second user 20 may be directed to the text "whale" 35a at the lower end of the display face.

The gaze sensor 133 may receive gaze information of the first user 10 and gaze information of the second user 20. The controller of the display apparatus may determine a display direction of each second part based on input gaze information. That is, the controller may maintain a display direction of the text "habitat" 34 to which the gaze of the first user 10 is directed. The controller may implement mirror flipping on the text "whale" 35a to which the gaze of the second user 20 is directed.

Referring to FIG. 4(2), the display apparatus configured to display content based on gaze information is shown. That is, the display apparatus may display the first part 31 in the form of an image and the text "habitat" 34 on the basis of a first direction in which the first user 10 is located. Simultaneously, the display apparatus may display the text "whale" 35b on the basis of a second direction in which the second user 20 is located. That is, the display apparatus may display content such that the plurality of second parts included in the same content are displayed toward different directions based on user gaze information.

The gaze of the first user 10 and the gaze of the second user 20 may be directed to the same second part. When the gaze sensor 133 simultaneously senses the gaze of the first user 10 and the gaze of the second user 20 with respect to the same second part, the controller may implement mirror flipping on the second part such that the second part is alternately displayed toward the first direction and the second direction for a predetermined period.

FIG. 5 is a view explaining a fourth embodiment of mirror flipping of content. Referring to FIG. 5, the embodiment of mirror flipping a second part when the sensor unit includes a touch sensor is shown.

Referring to FIG. 5(1), the sensor unit of the display apparatus may include a touch sensor 134 to enable a touch input from a second direction. The display apparatus may display content. The content may include the first part 31 in the form of an image and a second part 36a in the form of text.

The display apparatus may display the content on the basis of a direction in which the first user 10 is located. The second user 20 may input a touch instruction in the second direction. The controller of the display apparatus may implement mirror flipping on the touched second part 36a based on the input touch instruction and touch position information.

Referring to FIG. 5(2), a mirror flipped second part 36b is shown. That is, the display apparatus may display the first part 31 in the form of an image on the basis of the first direction in which the first user 10 is located. Simultaneously, the display apparatus may display the second part 36b in the form of text on the basis of the second direction in which the second user 20 is located.

Mirror flipping of the second part 36b may be implemented in various ways. For example, while the second user 20 maintains a touch, the display apparatus implements mirror flipping on the second part such that the second part is displayed on the basis of the second direction. Then, when the touch input of the second user 20 ends, the display apparatus again implements mirror flipping on the second part such that the second part is displayed on the basis of the first direction. Alternatively, when a touch input of the second user 20 occurs, the display apparatus may implement mirror flipping on the second part such that the second part is displayed on the basis of the second direction. Thereafter, when a touch input of the first user 10 occurs, the display apparatus may implement mirror flipping on the second part such that the second part is displayed on the basis of the first direction. Alternatively, when a touch input of the second user 20 occurs, the display apparatus may implement mirror flipping on the second part such that the second part is alternately displayed on the basis of the first direction and the second direction for a predetermined period.

Figure 6:
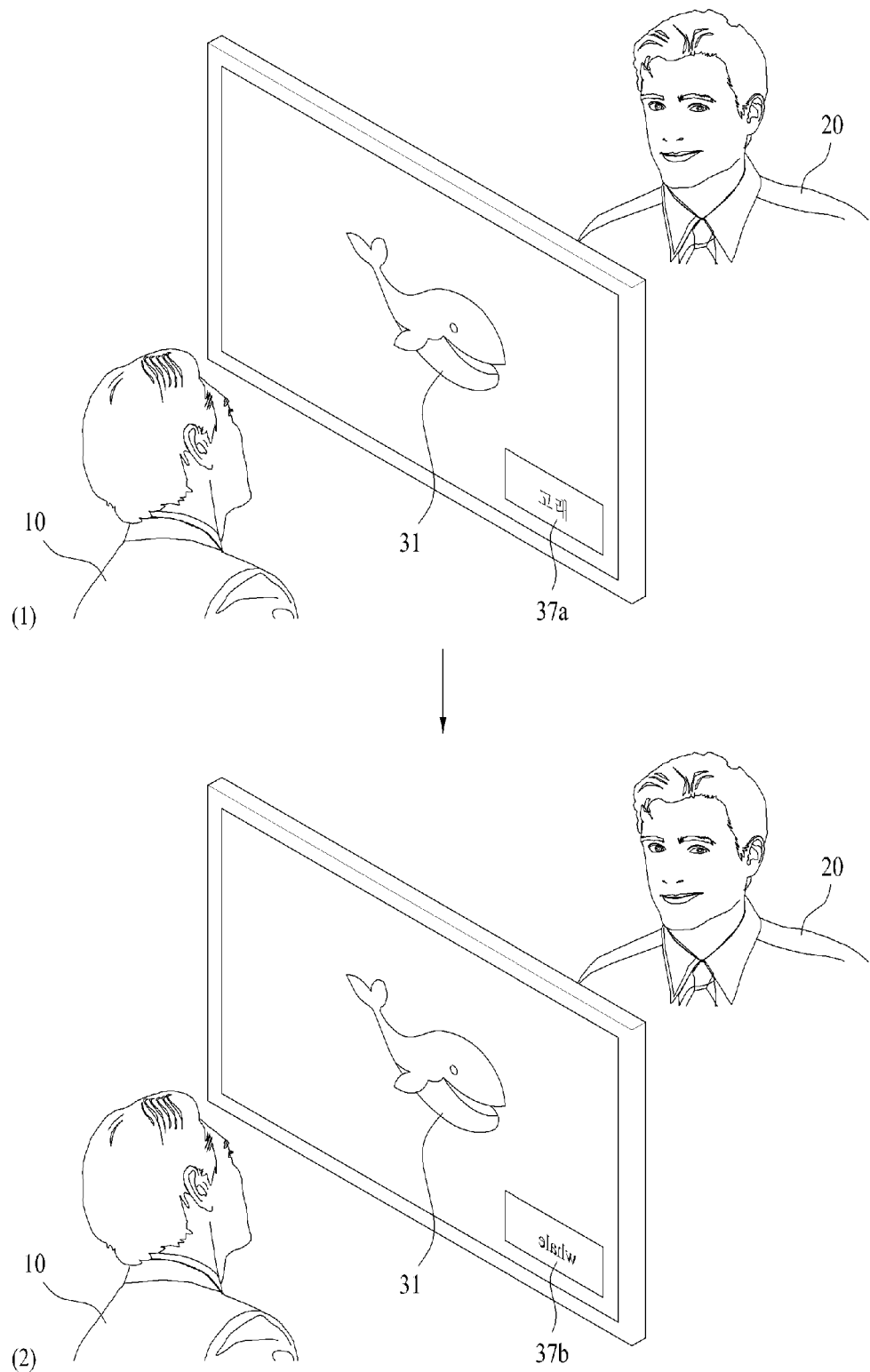
FIG. 6 is a view explaining an additional function of mirror flipping in accordance with one embodiment of the present disclosure.

FIG. 6 is a view explaining an additional function of mirror flipping in accordance with one embodiment of the present disclosure.

Referring to FIG. 6(1), the first user 10 and the second user 20 are located respectively in opposite directions of the display apparatus. The display apparatus may display content including the first part 31 in the form of an image and a second part 37a in the form of text. The second part 37a in the form of text may be displayed in a first language. The display apparatus may implement mirror flipping on the second part 37a upon sensed information of the second user 20 located in a second direction.

Referring to FIG. 6(2), a mirror flipped second part 37b is shown. That is, the display apparatus may display the first part 31 in the form of an image on the basis of a first direction in which the first user 10 is located. Simultaneously, the display apparatus may display the second part 36b in the form of text on the basis of the second direction in which the second user 20 is located.

In this case, the second part 37b in the form of text may be displayed in a second language. That is, the second part in the form of text may be displayed in the first language when displayed toward the first direction, and may be displayed in the second language when displayed toward the second direction. For example, the second part may be displayed in Korean when displayed toward the first direction, and may be displayed in English when displayed toward the second direction.

As occasion demands, the second part may be mirror flipped so as to be alternately displayed on the basis of the first direction and the second direction for a predetermined period. In this case, the second part in the form of text may be successively switched from the first language to the second language or vice versa based on display direction.

Figure 7:
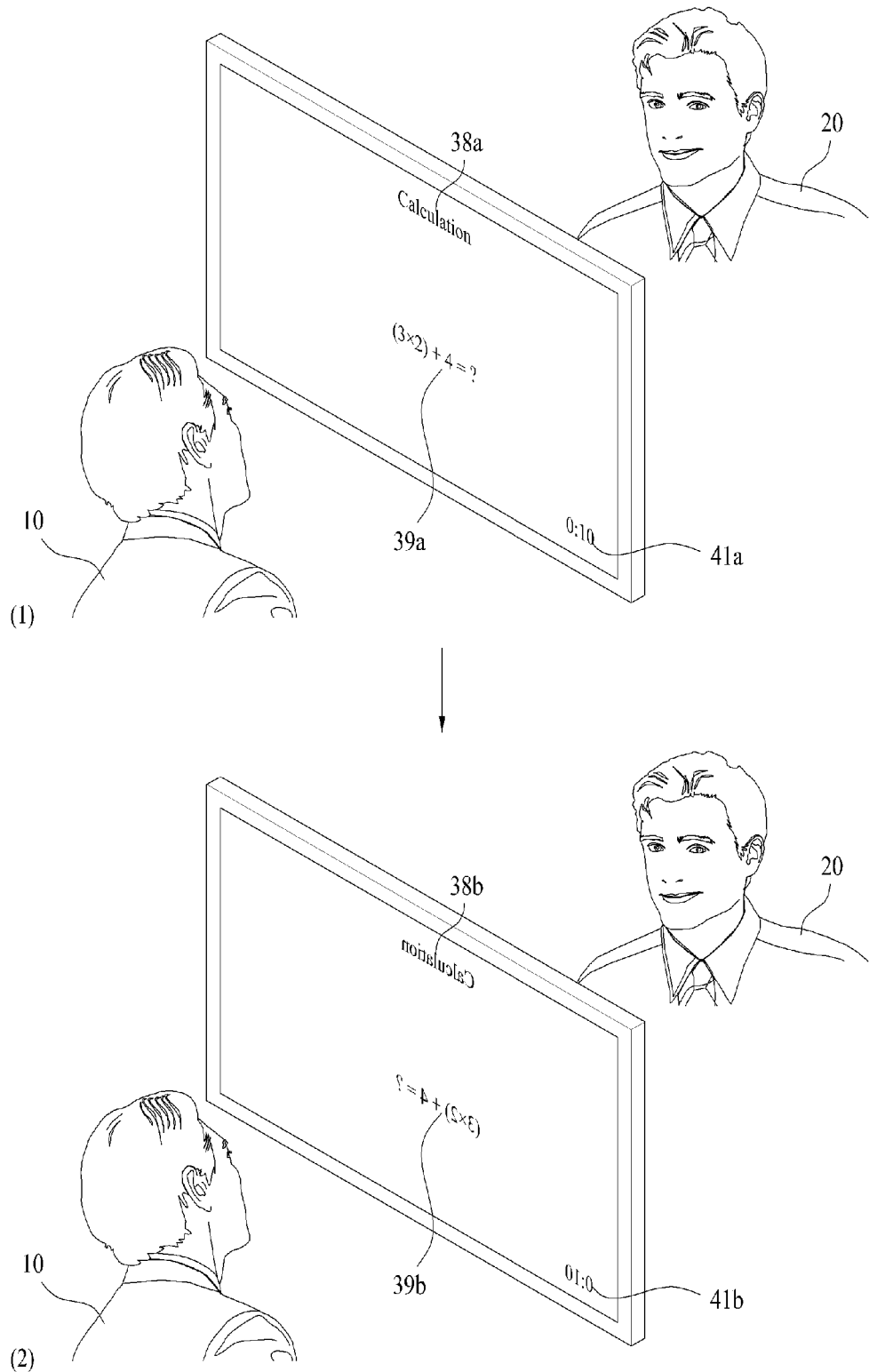
FIG. 7 is a view explaining another additional function of mirror flipping in accordance with one embodiment of the present disclosure.

FIG. 7 is a view explaining another additional function of mirror flipping in accordance with one embodiment of the present disclosure. In FIG. 7, the embodiment of alternately displaying a second part on the basis of a first direction and a second direction will be explained. As described above, the controller of the display apparatus may implement mirror flipping on the second part such that the second part is alternately displayed in a first direction and a second direction for a predetermined period.

Referring to FIG. 7(1), the display apparatus displays content toward a first direction in which the first user 10 is located. The content includes characters 38a, an equation 39a, and a time 41a. The characters 38a, the equation 39a, and the time 41a may be set to the second part as an object of mirror flipping.

The time 41a may be a predetermined value and represent one turn. In FIG. 7(1), one turn may be 10 seconds, and the second parts 38a, 39a and 41a may be mirror flipped so as to be displayed toward a second direction after 10 seconds. Alternatively, when an input of the first user 10 occurs within a predetermined time (10 seconds in FIG. 7), one turn ends, and the display apparatus may implement mirror flipping on the second parts 38a, 39a and 41a such that the second parts 38a, 39a and 41a are displayed toward the second direction. In this case, information related to the predetermined time may not be displayed.

Referring to FIG. 7(2), second parts 38b, 39b and 41b, which have been mirror flipped so as to be displayed toward a second direction in which the second user 20 is located, are shown. That is, the display apparatus may implement mirror flipping on the second parts when a predetermined time ends or when a predetermined input of the first user 10 occurs. Thus, the second parts 38b, 39b and 41b may be displayed toward the second direction in which the second user 20 is located. Likewise, the second parts 38b, 39b and 41b, which have been mirror flipped so as to be displayed toward the second direction, may again be mirror flipped so as to be displayed toward the first direction when a predetermined time ends or a predetermined input of the second user 20 occurs.

As described above, the second part may be mirror flipped so as to be alternately displayed toward a first direction and a second direction for a predetermined period. The predetermined period may be one turn set to at least one of a time interval until a predetermined time ends and a time interval until a user instruction is input.

In another embodiment, a mirror flipping period of the second part including text may be set based on the length of text. That is, when the second part includes text, a predetermined period may be set based on at least one of the length of text and the number of words included in text. For example, the period may be set to 2 seconds when the number of characters included in text is 10 or less, and may be set to 4 seconds when the number of characters is 20 or less. Alternatively, the period may be set to 1 second when text includes one word, and may be set to 2 seconds when text includes two words. Alternatively, the user may set a mirror flipping period.

The above described embodiment may be applied to repeated mirror flipping of the second part, which is implemented upon recognition of a first user in a first direction and a second user in a second direction.

Meanwhile, the display apparatus may include the sensor unit to receive a touch instruction from both a first direction and a second direction. The display apparatus may receive a touch instruction from any one user with respect to the second part during the repeated mirror flipping of the second part. In this case, when the controller of the display apparatus receives a touch instruction with respect to the second part to be mirror flipped, the controller may hold mirror flipping of the second part such that the second part is displayed in a direction in which the touch instruction is input. Then, when input of the touch instruction stops, the display apparatus may again repeatedly implement mirror flipping on the second part.

In addition, the display apparatus may stop the repeated mirror flipping of the second part when the second user in the second direction disappears. That is, the controller of the display apparatus may stop mirror flipping of the second part when information related to the second user in the second direction is not sensed. In this case, the second part may be displayed toward the first direction.

FIG. 8 is a view explaining one embodiment related to switching of the display direction of content.

Referring to FIG. 8(1), a first user 11 watches content while gripping the display apparatus by hand. Content may include a first part 42 in the form of an image and a second part 46 in the form of text. In this case, the sensor unit of the display apparatus may receive information sensed in a first direction. That is, the sensor unit may receive information related to a touch on a display face by the first user 11. The sensor unit may sense information related to at least one of a touch area and a touch shape of the hand of the first user 11 that grips the display apparatus.

For example, when the first user 11 grips the display apparatus, the fingerprint of the thumb comes into contact with a display face in a first direction and the fingerprint of the index finger comes into contact with a display face in a second direction. Thus, the display apparatus may determine a direction in which the first user 11 is located by sensed information related to at least one of a touch area and touch shape of the hand of the first user 11.

Referring to FIG. 8(2), a second user 21 watches content while gripping the display apparatus by hand. As described above with reference to FIG. 8(1), the sensor unit may sense information related to at least one of a touch area and touch shape of the hand of the second user 21. The controller of the display apparatus may determine a direction in which the user is located based on the sensed information. The controller may display a first part 43 on the basis of a determined direction. That is, the display apparatus may display content including the first part 43 and a second part 47 on the basis of a second direction under judgment that the second user 21 is located in the second direction. FIG. 8(2) shows the case in which the first user 11 is not sensed. When the first user 11 is additionally sensed, the display apparatus may display the mirror flipped second part 47 as described above.

FIG. 9 is a view explaining a control method of the display apparatus in accordance with one embodiment of the present disclosure.

Referring to FIG. 9, the display apparatus may display content including a first part and a second part on the basis of a first direction in which a first user is located (S910). The first part and the second part may be included in the same content, the first part may be set to maintain the first direction in which the first user is located, and the second part may be set to be mirror flipped on the basis of a second direction.

The display apparatus may receive information sensed in the second direction opposite to the first direction (S920). In a general display apparatus, the first direction may mean a front direction of a display unit that displays content, and the second direction may mean a direction opposite to the first direction on the basis of a display face of the display unit.

The second part may be mirror flipped so as to be displayed on the basis of the second direction based on input sensed information (S930). The display apparatus may display the first part in the first direction and the mirror flipped second part (S940).

Meanwhile, the display apparatus may implement mirror flipping on the second part such that the second part is alternately displayed in the first direction and the second direction for a predetermined period upon receiving information sensed from the first user in the first direction and the second user in the second direction. When the second part includes text, the predetermined period may be set based on at least one of the length of text and the number of words included in text. In addition, the text may be displayed in a first language when displayed in the first direction, and may be displayed in a second language when displayed in the second direction.

As is apparent from the above description of the embodiments, a display apparatus and a control method thereof may allow users who located in opposite directions of a display unit in effectively enjoying the same content, owing to mirror flipping of a part of the content.

According to the display apparatus and control method thereof, it is possible to alternately display content in opposite directions for users located in opposite directions of the display unit.

According to the display apparatus and control method thereof, it is possible to sense the gaze of a user and to display a part of content, to which the gaze of the user is directed, toward the user.

According to the display apparatus and control method thereof, it is possible to display a part of content in different languages upon mirror flipping of the part.

In addition, according to the display apparatus and control method thereof, it is possible to display content based on information related to a touch area and a touch shape of the user hand, increasing user convenience.

The above described display apparatus and control method thereof are included in at least one of the embodiments of the present disclosure, and should not be limited to only one embodiment. In addition, the display apparatus and control method thereof as illustrated in each embodiment may be implemented with regard to other embodiments as they are combined with one another or modified by those skilled in the art.

Meanwhile, the control method of the display apparatus in accordance with the present disclosure may be implemented as code that may be written on a processor readable recording medium and thus read by a processor provided in the display apparatus. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

It will be apparent that, although the preferred embodiments of the present disclosure have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

What is claimed is:

1. A display apparatus comprising:
   a transparent display unit configured to display content including a first part and a second part based on a first direction in which a first user is located;
   a sensor unit configured to receive information sensed in a second direction opposite to the first direction; and
   a controller configured to implement mirror flipping on the second part to be displayed in the second direction according to the received sensed information,
   wherein the transparent display unit displays the first part in the first direction and the mirror flipped second part, and
   wherein the first part and the second part are included in same content, the first part is set to maintain the first direction in which the first user is located, and the second part is set to be mirror flipped based on the second direction,
   wherein the mirror flipped second part is alternately displayed in the first direction and the second direction for a predetermined period, and
   wherein the predetermined period is set based on at least one of a length of text and a number of words included in text when the second part includes text.

2. The display apparatus according to claim 1, wherein the mirror flipped second part is displayed as being switched from left to right while maintaining a displayed position thereof.

3. The display apparatus according to claim 1, wherein the sensor unit includes a camera oriented to capture an image of a subject in the second direction,
   wherein the camera captures an image of a second user located in the second direction, and
   wherein the controller implements mirror flipping the second part upon recognizing the second user based on information related to the captured image.

4. The display apparatus according to claim 1, wherein the sensor unit includes a proximity sensor configured to sense a subject in the second direction,
   wherein the proximity sensor senses information related to the second user located in the second direction, and
   wherein the controller implements mirror flipping the second part upon recognizing the second user based on the sensed information.

5. The display apparatus according to claim 1, wherein the sensor unit includes a gaze sensor configured to sense gaze of the first user and second user,
   wherein the gaze sensor receives information related to the gaze of the second user located in the second direction, and
   wherein the controller implements mirror flipping the second part, to which the gaze of the second user is directed, based on the gaze information.

6. The display apparatus according to claim 5, wherein the controller implements mirror flipping the second part to be alternately displayed in the first direction and the second direction for a predetermined period when the gaze sensor simultaneously senses the gaze of the first user and the gaze of the second user with respect to the second part.

7. The display apparatus according to claim 1, wherein the sensor unit includes a touch sensor configured to enable a touch input from the second direction,
   wherein the touch sensor receives a touch instruction of the second user, and
   wherein the controller implements mirror flipping the touched second part based on the touch instruction.

8. The display apparatus according to claim 1, wherein the predetermined period is set to at least one of a time interval until a predetermined time ends or a time interval until a user instruction is input, wherein the predetermined period is one turn.

9. The display apparatus according to claim 1, wherein the text is displayed in a first language when displayed in the first direction, and is displayed in a second language when displayed in the second direction.

10. The display apparatus according to claim 1, wherein the controller stops mirror flipping of the second part when no information is sensed in the second direction.

11. The display apparatus according to claim 1, wherein, upon receiving a touch instruction with respect to the second part to be mirror flipped, the controller holds mirror flipping of the second part to be displayed in a direction in which the touch instruction is input.

12. The display apparatus according to claim 1, wherein the second part includes at least one of text, video, and a map.

13. The display apparatus according to claim 1, wherein the sensor unit further receives information sensed in the first direction, and senses information related to at least one of a touch area and a touch shape of the user hand that grips the display apparatus, and
    wherein the controller determines a direction in which the user is located based on the sensed information, and displays the first part based on the determined direction.

14. A control method of a display apparatus including a transparent display unit, the control method comprising:
    displaying, by the transparent display unit, content including a first part and a second part based on a first direction in which a first user is located;
    receiving, by a sensor unit of the display apparatus, information sensed in a second direction opposite to the first direction;
    implementing, by a controller of the display apparatus, mirror flipping on the second part to be displayed in the second direction according to the received sensed information; and
    displaying, by the transparent display unit, the first part in the first direction and the mirror flipped second part,
    wherein the first part and the second part are included in same content, the first part is set to maintain the first direction in which the first user is located, and the second part is set to be mirror flipped based on the second direction,
    wherein the mirror flipped second part is alternately displayed in the first direction and the second direction for a predetermined period, and
    wherein the predetermined period is set based on at least one of a length of text and a number of words included in text when the second part includes text.

15. The control method according to claim 14, further comprising implementing mirror flipping the second part to be alternately displayed in the first direction and the second direction for a predetermined period.

16. The control method according to claim 15, wherein the predetermined period is set based on at least one of the length of text and the number of words included in text when the second part includes text.

17. The control method according to claim 16, wherein the text is displayed in a first language when displayed in the first direction, and is displayed in a second language when displayed in the second direction.

18. The control method according to claim 15, further comprising stopping mirror flipping of the second part when no information is sensed in the second direction.

\* \* \* \* \*